United States Patent
Van Gestel et al.

(10) Patent No.: US 9,596,243 B2
(45) Date of Patent: Mar. 14, 2017

(54) METHOD AND SYSTEM FOR RESTORING DOMAIN MANAGEMENT

(75) Inventors: Henricus Antonius Wilhelmus Van Gestel, Eindhoven (NL); Marcel Van Nieuwenhoven, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 366 days.

(21) Appl. No.: 13/393,668

(22) PCT Filed: Aug. 16, 2010

(86) PCT No.: PCT/IB2010/053685
§ 371 (c)(1),
(2), (4) Date: Mar. 1, 2012

(87) PCT Pub. No.: WO2011/030248
PCT Pub. Date: Mar. 17, 2011

(65) Prior Publication Data
US 2012/0167226 A1    Jun. 28, 2012

(30) Foreign Application Priority Data
Sep. 11, 2009 (EP) .................................. 09170094

(51) Int. Cl.
*H04L 29/06* (2006.01)
*H04N 21/436* (2011.01)
(Continued)

(52) U.S. Cl.
CPC ........ *H04L 63/104* (2013.01); *G06F 21/6272* (2013.01); *H04L 63/126* (2013.01);
(Continued)

(58) Field of Classification Search
USPC .......................................................... 726/26
See application file for complete search history.

(56) References Cited

U.S. PATENT DOCUMENTS 8,156,344 B2    4/2012   Kim et al.
2002/0157002 A1*  10/2002   Messerges et al. ........... 713/155
(Continued)

FOREIGN PATENT DOCUMENTS

CN    101075877 A    11/2007
CN    101137973 A     3/2008
(Continued)

OTHER PUBLICATIONS

"Marlin Architecture Overview"; Dec. 2007, Marlin Developer Community, 27 Page Document. Retrieved From the Internet: http://www.marlin-community.com/public/MarlinArchitectureOverview.pdf, on Mar. 3, 2011.
(Continued)

*Primary Examiner* — Harris C Wang

(57) ABSTRACT

A method and a system for restoring domain management for a domain in which content access rights are shared between one or more devices, where the domain management was executed by a first demean management device and is discontinued by this first domain management device. The first domain management device registers one or more characteristics of the domain at a domain registration server. After discontinuation of the domain management by the first domain management device, a second domain management device sends a request to the domain registration server for obtaining the right to manage the domain. The domain registration server provides the right to manage the domain together with the at least one of the one or more registered characteristics of the domain.

19 Claims, 3 Drawing Sheets

(51) Int. Cl.
*H04N 21/8355* (2011.01)
*G06F 21/62* (2013.01)

(52) U.S. Cl.
CPC ... *H04N 21/43615* (2013.01); *H04N 21/8355* (2013.01); *G06F 2221/0706* (2013.01); *G06F 2221/2137* (2013.01)

(56) References Cited

U.S. PATENT DOCUMENTS

| | | | |
|---|---|---|---|
| 2006/0294384 A1 | 12/2006 | Fukumizu | |
| 2007/0168665 A1 | 7/2007 | Kim et al. | |
| 2007/0180497 A1* | 8/2007 | Popescu | H04L 63/0435 726/4 |
| 2007/0250617 A1* | 10/2007 | Kim | G06F 21/105 709/223 |
| 2008/0052388 A1* | 2/2008 | Korkishko | H04L 63/06 709/223 |
| 2008/0133414 A1* | 6/2008 | Qin | G06F 21/10 705/50 |
| 2009/0300724 A1* | 12/2009 | Cho | G06F 21/10 726/4 |
| 2011/0099605 A1* | 4/2011 | Cha | H04W 12/06 726/3 |
| 2013/0152174 A1* | 6/2013 | Raley | G06F 21/31 726/4 |

FOREIGN PATENT DOCUMENTS

| | | |
|---|---|---|
| CN | 101232494 A | 7/2008 |
| EP | 1603044 A1 | 12/2005 |
| EP | 1848177 A1 | 10/2007 |
| JP | 2001136161 A | 5/2001 |
| JP | 2004259262 A | 9/2004 |
| JP | 2007006344 A | 1/2007 |
| JP | 2007183935 A | 7/2007 |
| JP | 2009151410 A | 7/2009 |
| JP | 2009199490 A | 9/2009 |
| WO | 2006098569 A1 | 9/2006 |
| WO | 2008100120 A1 | 8/2008 |

OTHER PUBLICATIONS

"Refusal, Remediation and Renewability in Marlin"; Marlin Developer Community, Jan. 2008, Downloaded From Thte Internet: http://www.marlin-community.com/public/RRR_WhitePapaer_v.1.3_14Jan08.pdf, on Mar. 3, 2011, 8 Page Document.

"Marlin Broadband Delivery System Specification"; Version 1.3 WD004, Martin Developer Community, Sep. 2007, 28 Page Document.

"Marlin-Broadband Shared Domain Topology Specification"; Version1.0 WD001, Marlin Developer Community, Oct. 2008, 11 Page Document.

"Marlin-Common Domain Specification"; Version 1.1.1, Marlin Developer Community, Sep. 2006, 74 Page Document.

"Marlin-Core System Specification"; Version 1.3.1 WD004; Marlin Engineering Workgroup, Jun. 2007, 154 Page Document.

"Marlin Shared Domain"; Application Note-Version 1.0; Cphilips Electronics, 2008, 16 Page Document.

* cited by examiner

METHOD AND SYSTEM FOR RESTORING DOMAIN MANAGEMENT

FIELD OF THE INVENTION

The invention relates to a method and a system for restoring domain management for a domain in which content access rights are shared between one or more devices, wherein the domain management was executed by a first domain management device. The invention further relates to a domain registration server and a domain management device for use in the system for restoring domain management.

BACKGROUND OF THE INVENTION

"Marlin" is an open-standard, content-sharing technology platform created by the Marlin Developer Community. Marlin provides a Digital Rights Management platform in which access control technologies are provided which may be used in devices and computer programs. By means of licensing and encryption, content providers, publishers and/or copyright holders may protect the distributed content according to the Marlin standard. The main document of the standard is "Marlin-Core System Specification", created by the Marlin Engineering Group and distributed by the Marlin Community.

Devices that support the Marlin standard are able to download the content by means of Marlin technology from a content provider if the user of the device has an account at the content provider. If the license of the downloaded content allows playing of the content, and if the device has the decryption key, the Marlin device may play the content to the user of the device.

The Marlin standard introduces the concept of a Marlin domain. A Marlin domain is a group of Marlin devices which share a set of protected content. All devices in the Marlin domain have the same access rights to the content of the domain. Obtained Marlin content, together with a license and a decryption key, is bound to the domain and not to individual devices.

In a Marlin domain, one of the devices is the domain manager. The domain manager controls the domain by binding new devices to the domain or releasing the binding between the domain and devices that are bound to the domain. Content providers trust the domain manager and demand that the domain manager prevents misuse, for example, by limiting the number of devices bound to the domain. Devices of a Marlin domain are connected to a shared network, or they share the network on a regular basis. For example, a user may have a home network to which most of his digital devices are permanently connected. One of the devices is the domain manager, preferably a permanently connected device. The user may have portable digital devices as well, which are connected to the network when the devices are in the home. The portable devices obtain the content, the licenses and the decryption keys when they are connected to the home network. If the portable devices are not connected to the home network, they are able to play the content because they obtained the licenses and decryption keys at an earlier stage.

If the device on which the active domain management software resides breaks down, the domain will be damaged and probably lost. The central domain management functions, such as binding devices, content, licenses and decryption keys to the domain are discontinued. Much information is lost, such as the bindings between the content and the domain, and/or the bindings between the devices and the domain. Today, the only solution for overcoming the loss of a domain manager is creating a new domain which has to become a copy of the original domain. This is a cumbersome task because bindings have to be restored manually and content providers have to be contacted once again to obtain permission to bind the content to the new domain. However, content providers are not willing to provide permission to bind the content to the new domain without receiving new payments for the content. It is almost impossible for a content provider to find out whether the old domain is really lost and to decide whether the new domain may be trusted or is fraudulent.

SUMMARY OF THE INVENTION

In accordance with the first aspect of the invention, the method is provided for restoring domain management for a domain in which content access rights are shared between one or more devices, wherein the domain management was executed by a first domain management device. The method comprises a step of registering one or more characteristics of the domain at a domain registration server by the first domain management device before the first domain management device discontinues the management of the domain. The method further comprises the step of sending a request for obtaining the right to manage the domain from a second domain management device to the domain registration server. In a further step of the method, the domain registration server provides the right to manage the domain together with at least one of the registered one or more characteristics to the second domain management device.

The method prevents loss of the domain and loss of important data related to the domain. The first domain management device, which is initially managing the domain, registers one or more characteristics at the domain registration server. The information provided by the first domain management device is stored on the domain registration server. Later on, the device management may be discontinued by the first domain management device, because it is broken down, damaged or, for example, thrown away by the user. Because of the discontinuation of the domain management, important information related to the domain and stored on the first domain management device is lost. However, the domain registration server stores the one or more important domain characteristics that have to be used to restore the domain. Another device, which is capable of managing the domain, is installed as a second domain management device. In order to get the domain running on the second domain management device, it has to send the domain registration server a request for obtaining the right to manage the domain. Subsequently, the domain registration server may provide the right to manage the domain to the second domain management device. Together with the right to manage the domain, the domain registration server provides at least one of the registered one or more characteristics of the domain. The second domain management device uses the at least one received characteristic of the domain to set up the domain as originally managed by the first domain management device. Loss of important data required to run a domain is prevented by following the steps given above.

The domain registration server is preferably run by a trusted party which is trusted by content providers. The information registered by the first domain management device is preferably securely stored and protected against fraudulent attackers.

The first domain-management device and the second domain management device will communicate with the domain registration server via a data network. Registering one or more characteristics, sending a request, providing the right to manage the domain, and/or refusing the right to manage the domain will be transmitted in data messages over the data network from the domain management devices to the domain registration server, or vice versa.

It is not necessary that the first domain management device discontinues the management of the device because the domain management software is not able to function anymore on the first domain management device. In another embodiment, the second domain management device likes to take over the management of the domain from the first domain management device. In order to discontinue the domain management by the first domain management device, the second domain management device requests the first domain management device to give up its task, or the domain registration server sends a request to the first domain management device to discontinue the management of the domain.

In an embodiment, the domain registration server provides the right to manage the domain only if the domain registration server trusts the second domain management device. In a further embodiment, the right to manage the domain is explicitly refused by the domain registration server if this server does not trust the second domain management device. Trusting the domain management device means that the domain registration server trusts the second domain management device to a sufficient extent. Consequently, distrusting the device means that there is not enough trust.

Besides being a server for storing one or more characteristics of the domain, the domain registration server is a central server that prevents misuse and fraud. The domain registration server may possibly detect distrust of a request from a domain management device for obtaining the right to manage the domain. If a device is not trusted, it is an indication of possible fraud or possible misuse. In such situations, it is better not to provide the right to manage the domain, because the content providers are only willing to provide content to domains that may be restored by using the domain registration server if this server fights against misuse and fraud. For example, if a second domain management device obtains the right to manage the domain, and the first domain management device, which is supposed to be out of order, contacts the domain registration server, it will be unmistakably clear to the domain registration server that the first domain management device or the second domain management device may not be trusted anymore. In this situation, two domain management devices seem to manage the domain, which is not allowed by the content providers. In another example, when the domain registration server receives, within a short period, a plurality of requests to restore the domain, it is obvious that the domain management devices sending the requests may not be trusted.

In an embodiment, the right to manage the domain is either an indefinite or a temporal right. The possibility of providing the indefinite or the temporal right to manage the domain results in the possibility of providing different rights to manage the domain to different types of domain management devices. The domain registration server is able to differentiate between different types of second domain management devices. The domain registration server may provide, for example, an indefinite right to manage the domain to a second domain management device that has domain management software installed in accordance with the latest digital rights management standards, or the temporal right may be provided to devices which have older software installed. In another embodiment, content providers may require that a domain management server which is running a restored device may only have the temporal right to manage the domain. The content providers may like the concept of restoring domain management after discontinuation of the domain management device, but they may only support this concept by introducing an additional condition: a domain may only be restored on the basis of a temporal right to manage the domain.

In a further embodiment, the domain registration server provides the temporal right to manage the domain if the domain registration server reasonably trusts the second domain management device. The domain registration server provides an indefinite right to manage the domain if the domain registration server has great trust in the second domain management device. In another embodiment, the right to manage the domain is explicitly refused if the domain registration server does not sufficiently trust the second domain management device.

As described hereinbefore, the fact that the decision to grant an indefinite or a temporal right to manage the domain is based on the extent to which the domain registration server trusts a domain management device introduces an additional point in time at which the domain registration server is able to combat fraud and misuse. It is a point in time at which an earlier decision may be corrected on the basis of new insights. For example, in an embodiment, the first domain registration server may have been repaired and the domain management software may have been uninstalled on the first domain registration server. During the process of removing the domain management software, the first domain management device provided the domain registration with a notice of removal of the software. Knowledge of the removal of the software on the first domain management device results in more trust in the second domain management device by the domain registration server.

In another embodiment, the method further comprises the step of requesting prolongation of the temporal right to manage the domain by the second domain management device, and further comprises the step of providing prolongation of the temporal right to manage the domain by the domain registration server to the second domain management device.

The second domain management device that has only a temporal right to manage the domain has to request a prolongation, otherwise it will not be able to continue the domain management after the moment when the temporal right to manage the domain terminates. Furthermore, receiving a request to prolong the temporal right to manage the domain informs the domain registration server that the second domain management device is still operating and willing to manage the domain. The knowledge of the domain registration server is thus updated by receiving the request.

In a further embodiment, prolongation of the temporal right to manage the domain is only provided if the domain registration server reasonably trusts the second domain management device. If the domain registration server has great trust in the second domain management device, it will prolong the temporal right to manage the domain by providing an indefinite right. If the domain registration server does not sufficiently trust the second domain management device, it will refuse prolongation of the temporal right to manage the domain.

The fact that a domain management device with a temporal right to manage the domain has to request prolongation of this right introduces another security step which may be used by the domain registration server to combat misuse and fraud. The decision to grant an indefinite right to manage a device cannot be cancelled, even if it appears to be an incorrect decision. By refusing prolongation of the temporal right to manage the domain, the domain registration server has the ability to neutralize the effect of an incorrect decision or to stop management of the domain by a fraudulent domain management device.

In an embodiment, the domain registration server stores, in a domain history data file, a set of activities that are performed on the domain registration server with regard to the domain. The domain registration server executes an analysis of the domain history data file in order to determine the extent to which the domain registration server trusts the second domain management device.

The domain registration server that analyzes the domain history data file is well capable of deciding whether the second domain management device may be trusted or not. The domain history data file provides reliable information on which a decision to grant a, possibly temporal, right may be based. Based on a set of rules, which assign positive or negative trust values to specific situations which may be registered in the domain history data file, the domain registration server may calculate a trust value for the second domain management device. The calculated trust value may be compared with predefined values. If the calculated value is lower than a first predefined value, there is not enough trust. If the calculated value is higher than a second predefined value, there is much trust. Otherwise, there is a reasonable extent of trust.

Because the relation between a domain and a content provider is based on trust, an additional server that is involved in the maintenance of the domain must be trusted by the content providers. By using and analyzing the domain history data file, the content providers may believe that the domain registration server is using a reliable process to determine the trust of a domain management device, and may thus trust the domain registration server and the domain even more. More trust between a content provider and a domain may result, for example, in receiving the permission to bind more devices in the domain from the content provider, or in a lower price for the content.

Information that is stored in the domain history data file may comprise information related to one or more of the following activities: registering the one or more characteristics, receiving requests to obtain the right to manage the domain, results of previous analyses, providing and/or refusing the right to manage the domain. Items of information of these activities are, for example: the moment when the activity took place, the domain management device with which the communication took place, which exact information was registered, pointers to locations where the one or more characteristics were stored, etc. It should be noted that the information in the domain history data file is not limited to the above-mentioned examples. Basically, the information stored in the domain history data file is the information required to combat misuse and fraud.

An analysis of the data history file may include all kinds of statistical analyses, for example, the number of received requests to obtain the right to manage the domain, the frequency with which requests to obtain the right to manage arrived, the number of refusals of obtaining the right to manage the domain, etc. In another analysis, the domain registration server may build a list of domain management devices which are supposed to be out of order, including the information since when they are supposed to have been out of order. This information may be combined with the timestamps of the moments at which the same, or other, domain management devices tried to contact the domain registration server. The embodiments of the analysis are not limited to the specific examples mentioned above. An analysis based on using artificial intelligence is another example. Or, in another example, an operator of the domain registration server is involved in the analysis.

In another embodiment, the method further comprises the step of detecting fraud with regard to the domain by analyzing the domain history data file. This analysis is performed by the domain registration server. The method further comprises the step of inactivating the domain management by the first domain management device and/or the second domain management device by the domain registration server. Several solutions may be used to inactivate the domain management. In an embodiment, a domain inactivation agent is sent from the domain registration server to the first and/or to the second domain management device after detection of fraud committed by the respective first and/or second domain management device. The domain inactivation agent is a piece of program code that is automatically executed on the respective first and/or second domain management device. Automatic execution of the program code of the domain inactivation agent results in inactivation of the domain management by the respective first and/or second domain management device.

Detection of fraud and sending of the domain inactivation agent improve the reliability of the method of restoring domain management. Sending the domain inactivation agent from the domain registration server to the domain management device is fraudulent and results in termination of the fraud.

As described in the embodiment hereinbefore, the analysis of the domain history data file may include matching timestamps of receiving data from domain management devices with the timestamps representing the moment since when domain management devices are supposed to have been out of order. It may result in the detection of fraud committed by the first domain management device if this device contacts the domain registration server, although the domain registration is supposed to have been out of order for a long time. It may also result in the detection of possible fraud committed by the second domain management device if, in a short period after provision of the right to manage the domain to the second domain management device, many requests for obtaining the right to manage the domain were received.

The domain inactivation agent is executed on the domain management device that receives the domain inactivation agent. The domain inactivation agent contains instructions that are executed by the processor of the receiving domain inactivation agent. The instructions may delete, for example, the right to manage the domain, or may adapt the values of variables set in the receiving domain management device.

In a further embodiment, the one or more characteristics of the domain comprise at least one of the following items: name of the domain, policies of the domain, a list of devices bound to the domain, one or more copies of bindings between the devices of the domain and the domain, one or more copies of bindings between the content and the domain, one or more copies of licenses belonging to the content, one or more copies of security keys belonging to the content, or the password of the domain. It should be noted that the list does not limit the types of characteristics that may be registered at the domain registration server. Basically, all domain-related information that a domain management device has may be registered at the domain registration server. In an embodiment, all information that is required to restore the domain at the second domain registration server is registered at the domain registration server.

In another embodiment, the domain is a Marlin domain and the first and the second domain management device are Marlin devices.

In a further embodiment of the method of restoring domain management, the domain registration server is further arranged to create new domains. The method further comprises the steps of: requesting creation of the domain by the first domain management device at the domain registration server, creating the right to manage the domain in the domain registration server, and providing the right to manage the domain to the first domain management device.

This embodiment increases the security of the use of domains. The domain registration server creates the domain, and the domain management server only obtains the right to manage the domain. In fact, the domain registration server is the owner/creator of the domain and only distributes the right to manage the domain to another device. It is easier to withdraw the right to manage the domain than to withdraw the ownership/creatorship of the domain.

In an embodiment, the method further comprises the step of requesting the domain registration server to undo the registration of at least one of the registered one or more characteristics of the domain by the first or the second domain management device. The first or the second domain management device may release the bindings between the domain management device and the domain. For example, when a device wants to be moved from a first to a second domain, the binding between the first domain and the device has to be released by requesting the domain registration server to undo the registration of some of the characteristics that were registered before. The domain registration server will thus be up to date as much as possible, which assists restoring of the domain after discontinuation of the domain management of the initial domain management device.

The system in accordance with the second aspect of the invention comprises a domain registration server arranged to register one or more characteristics of the domain. The one or more characteristics are received from a first domain management device before the first domain management device discontinued management of the domain. The system further comprises a second domain management device arranged to send a request for obtaining the right to manage the domain. The second domain management device is further arranged to receive the right to manage the domain together with one or more characteristics of the domain. In response to receiving the request for obtaining the right to manage the domain, the domain registration server is further arranged to provide, to the second domain management device, the right to manage the domain together with at least one of the registered one or more characteristics of the domain. The system in accordance with the second aspect of the invention provides the same benefits as the method in accordance with the first aspect of the invention.

These and other aspects of the invention are apparent from and will be elucidated with reference to the embodiments described hereinafter.

Figure 1:
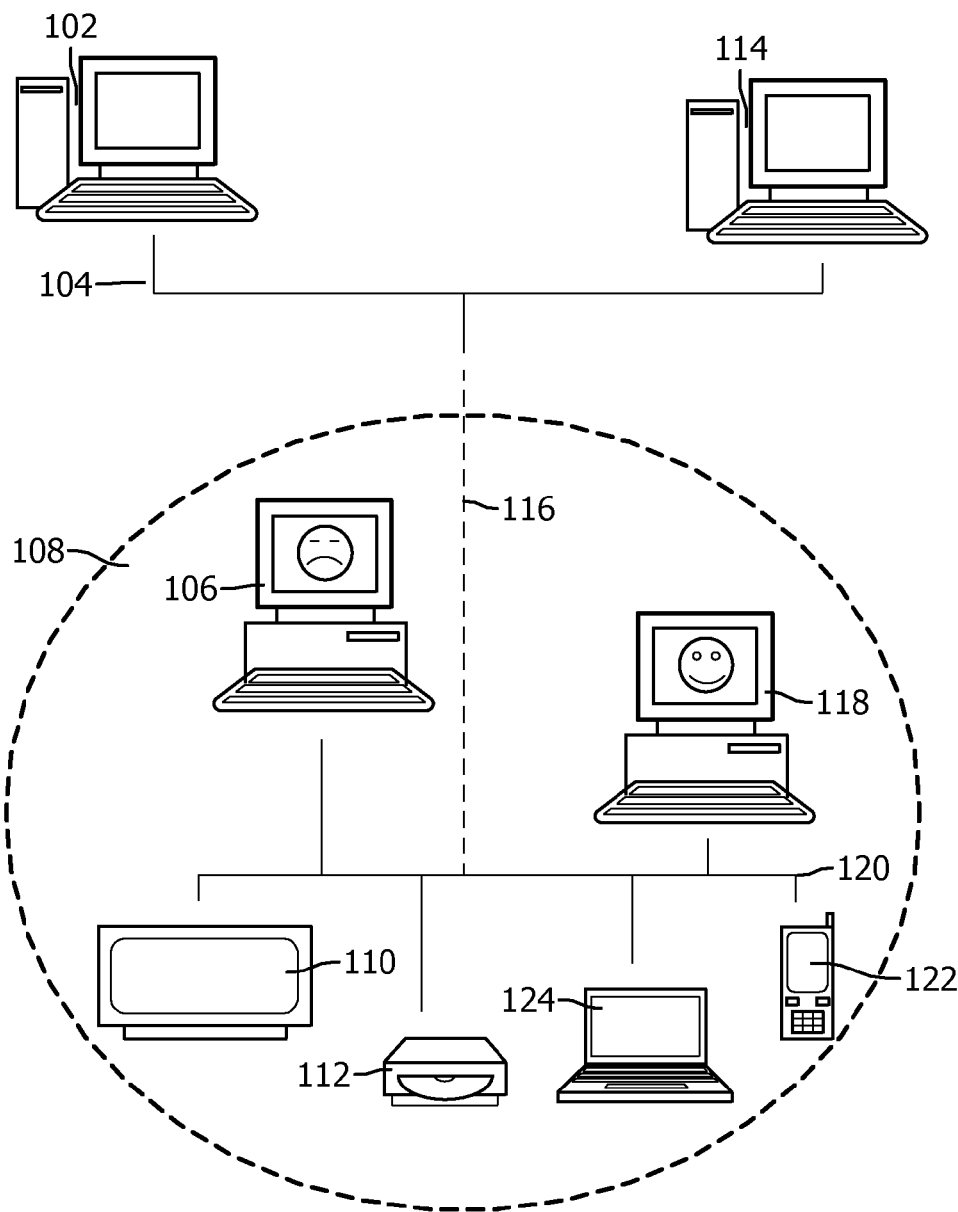
FIG. 1 schematically shows a domain with devices, a content provider and a domain registration server, FIG. 2 schematically shows a method of restoring domain management, FIG. 3 schematically shows a first embodiment of a system for restoring domain management, FIG. 4 schematically shows a second embodiment of a system for restoring domain management.

It should be noted that items denoted by the same reference numerals in different Figures have the same structural features and the same functions, or are the same signals. Where the function and/or structure of such an item have been explained, there is no necessity for repeated explanation thereof in the detailed description.

DETAILED DESCRIPTION OF THE EMBODIMENTS

A first embodiment is shown in FIG. 1. A plurality of devices 106, 110, 112, 118, 122, 124 is connected to a local area network 120. The devices 106, 110, 112, 118, 122, 124 are electronic digital devices of a user's household. The local area network 120 may be a wired network, a wireless network or a combination of both. The devices 106, 110, 112, 118, 122, 124 are members of the domain 108 or, in other words, they are bound to the domain. The domain 108 may be a Marlin domain and the devices 106, 110, 112, 118, 122, 124 may be Marlin devices.

Device 106 is a first domain management device implemented on a personal computer. Device 118 is a second domain management device also implemented on a personal computer. The domain management devices 106, 118 are capable of running software that manages the domain 108. In the case of a Marlin domain, the domain management software is implemented in accordance with the Marlin specifications.

Device 110 is a television which is capable of playing movies and audio. Device 112 is a game console which can play movies, audio and running games. Device 124 is a portable computer which can play movies, audio, running games and running programs. Device 122 is a mobile phone which can execute small applications and play audio. If the mobile phone 122 and/or the portable computer 124 are not in the neighborhood of the local area network 120, they become disconnected from this network. Although disconnected, the mobile phone 122 and the portable computer 124 are still bound to the domain 108.

The local area network 120 has a connection 116 with a wide-area network 104. The wide-area network 104 connects the local area network to a content server 102 of a content provider and to a domain registration server 114. The domain registration server 114 is maintained by a trusted party, at least trusted by the content provider, and in general widely trusted by the buyers of content. The content server 102 may provide digital content that is protected against misuse by means of Marlin Digital Rights Management technology.

The domain 108 is initially managed by the first domain management device 106. The second domain management device 118 is not in service as domain manager and is initially just a normal member of the domain 108. In an embodiment, the first domain management device 106 creates the domain 108 and asks the content server 102 for permission to use content, which is bought from the content provider, in the domain 108. In another embodiment, the first domain management device 106 sends the domain registration server 114 a request to create the domain 108 and the domain registration server 114 provides permission to manage the domain 108 to the first domain management device 106. The content provider trusts the domain registration server 114 as the creator of the domain and automatically provides permission to play/use/execute content obtained from the content server 102 at all devices 106, 110, 112, 118, 122, 124 of the domain 108.

The first domain management device 106 binds the devices 110, 112, 118, 122, 124 to the domain, for example, by providing domain-binding certificates to them or by providing a shared domain password to all of these devices 110, 112, 118, 122, 124. When a user uses one of the devices 106, 110, 112, 118, 122, 124, he may initiate contact with the content server 102 to obtain content, for example, videos, films, music files, games, mobile phone applications or software. The content is encrypted by the content server 102 and delivered to the obtaining device. The obtaining device, or the first domain management device 106, obtains the license and the decryption key which are required to play/use/execute the content. The license and the decryption key are bound to the domain 108, not to the individual devices 106, 110, 112, 118, 122, 124. In an embodiment, the first domain management device stores and manages the set of licenses and decryption keys related to the content of the domain 108 and provides licenses and decryption keys to the devices 106, 110, 112, 118, 122, 124 of the domain. In another embodiment, each individual device 106, 110, 112, 118, 122, 124 stores a subset of the licenses and keys and shares them with all of these devices of the domain 108.

If one of the devices 106, 110, 112, 118, 122, 124 wants to play/use/execute the content, it may have stored the content, the license and the decryption key, and if it is bound to the same domain to which the license and the decryption key are bound and the license policies are fulfilled, it may play/use/execute the content. In another embodiment, the device 106, 110, 112, 118, 122, 124 has to download the content and/or the license and/or the decryption key from another device 110, 112, 118, 122, 124 or from the first domain management device 106.

Just after creation of the domain, or at a later moment, the first domain management device 106 sends a message to the domain registration server 114 with which the first domain management device 106 registers one or more characteristics of the domain 108 at the domain registration server 114. The one or more characteristics may comprise one of the following: the name of the domain 108, policies of the domain 108, the list of devices 110, 112, 118, 122, 124 bound to the domain, copies of bindings between devices 110, 112, 118, 122, 124 and the domain 108, copies of licenses and decryption keys stored on the first domain management device 106, the domain password, etc. Depending on the specific digital rights management technology used to create the domain 108, these and other characteristics are important to restore the domain management. The first domain management device 106 registers at the domain registration server 114 at least the one or more characteristics that are required to restore the domain management. In an embodiment, the domain registration server 114 was the creator of the domain and the first domain management device 106 has to register only those important characteristics of which the domain registration server 114 was not yet aware.

If the domain 108 is in operation, the first domain management device 106 may bind new devices to this domain. New content together with licenses and decryption keys may be bound to the domain 108 as well. In an embodiment, the first domain management device 106 registers the one or more characteristics of the domain 108 at the domain registration server 114 on a regular basis so that the information stored on the domain registration server 114 represents the actual status of the domain 108.

After a while, the first domain management device 106 breaks down and results in the discontinuation of the domain management by the first domain management device 106. This means that the domain 108 is damaged and/or out of order. For example, no new devices may be bound to the domain 108, none of the current domain management devices 110, 112, 118, 122, 124 may leave the domain, content, licenses and decryption keys only stored on the first domain management device 106 are lost, as well as a list of member devices 110, 112, 118, 122, 124 of the domain 108, which was kept by the first domain management device 106. This is an inconvenient situation and may lead to severe problems if, for example, a user wants to view a movie on the portable computer 124, while the license and the decryption key of the movie were stored on the first domain management device 106.

The user may decide that the personal computer 118, which was already in use in his household, has to become the domain manager. The personal computer 118 is capable of running the domain management software and the user activates this software on the personal computer 118. The personal computer 118, which has to become the second domain management device 118, thus contacts the domain registration server 114 and requests the right to manage the domain 108.

In response to receiving the request for obtaining the right to manage the domain 108, the domain registration server 114 decides whether it either trusts or does not trust the second domain management device 118. The decision on whether the second domain management device 118 is trusted may be based on, for example, rules for granting the right to manage the domain 108, or on information provided by the second domain management device. For example, it may be a rule that it is not allowed to provide the right to manage the domain 108 to the second domain management device 118 within one week after registration of one or more characteristics of the first domain management device 106. It seems to be fraud if, in such a short time, the service of the domain registration server 114 is used multiple times to get another domain management device in operation for the domain 108. It may be a further rule that only one another domain management device is trusted once.

If the second domain management device 118 is trusted by the domain registration server 114, the right to manage the domain 108 is provided to the second domain management device 118. Together with the right to manage the domain 108, the second domain management device 118 receives the registered one or more characteristics of the domain 108, which were previously registered at the domain registration server 114 by the first domain management device 106. The received one or more characteristics are used by the second domain management device 118 to restore the management of the domain 108. The one or more characteristics are loaded into the domain management software.

If the second domain management device 118 is not trusted by the domain registration server 114, the domain registration server 114 refuses the second domain management device 118 the right to manage the domain 108. In an embodiment, a notification of the refusal may be sent from the domain registration server 114 to the second domain management device 118, or in another embodiment, the domain registration server 114 does not answer the request for obtaining the right to manage the device.

In another embodiment, the provided right to manage the domain 108 is a temporal right. The temporal right to manage the domain 108 comprises the right to manage this domain 108 for a limited period or the right to manage it until a specified date. Just before the end of the period in which the second domain management device 118 is allowed to manage the domain, the second domain management device 118 has to request prolongation of the temporal right to manage the domain 108 at the domain registration server 114. In response to receiving a request to prolong the temporal right to manage the domain 108, the domain registration server 114 has to decide once again in how far it trusts the second domain management device 118. If there is no trust, prolongation is refused. If there is trust above a specific level, the domain registration server 114 provides prolongation of the right to manage the domain 108. If the second domain management device 118 is completely trusted, the domain registration server 114 may provide an indefinite right to manage the domain.

Figure 2:
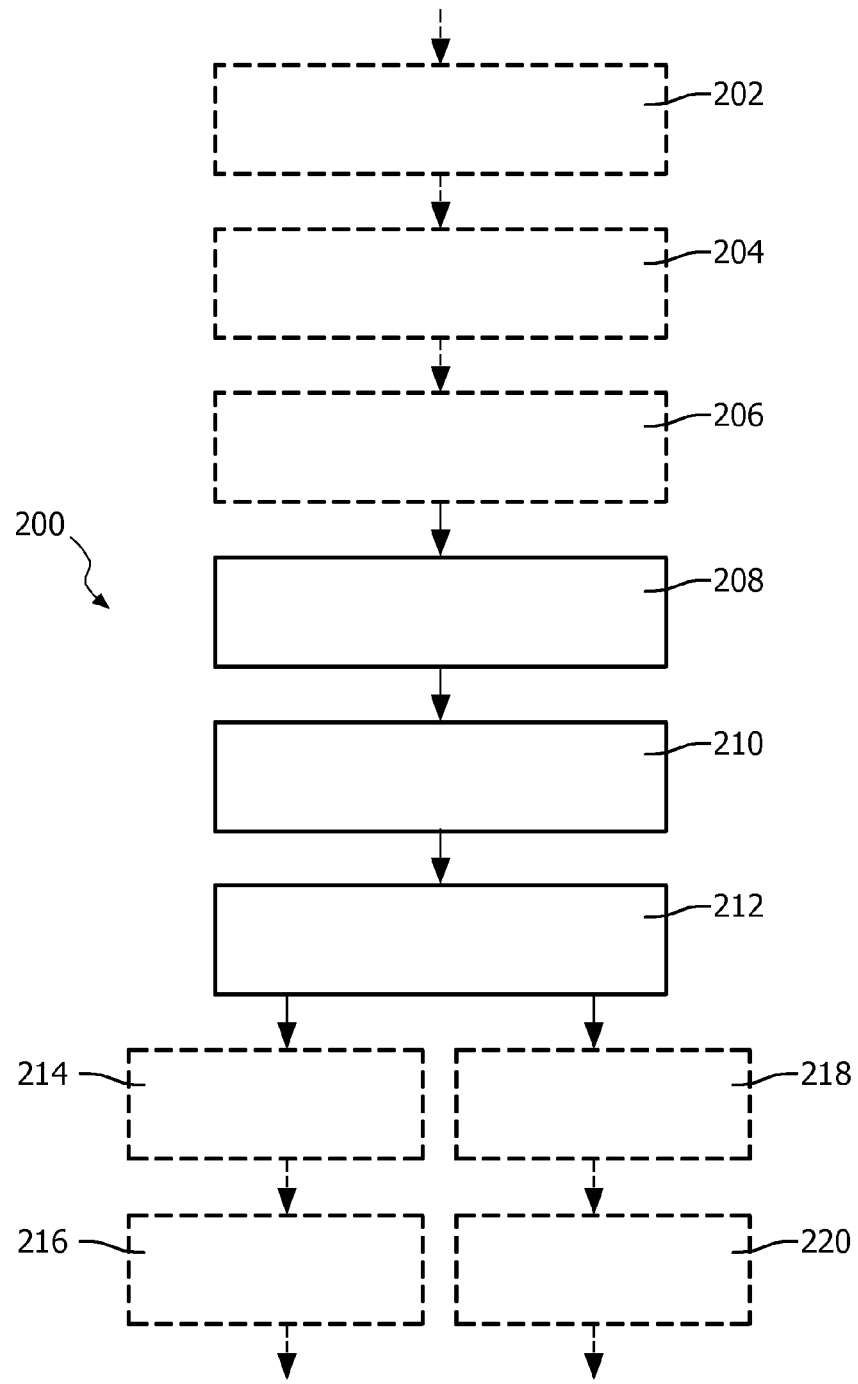

A second embodiment is shown in FIG. 2. FIG. 2 schematically shows a method 200 of restoring domain management of a domain. The method 200 is used in an environment with a domain for sharing content among a plurality of devices. The domain is managed by a first domain management device. In step 208, the first domain management device registers one ore more characteristics of the domain at a domain registration server. Later in time, the first domain management device discontinues the management of the domain, for example, as a result of a breakdown. In step 210, a second domain management device sends the domain registration server a request for obtaining the right to manage the domain. In response to receiving the request for obtaining the right to manage the domain, the domain registration server provides, in step 212, the right to manage the domain to the second domain management device. Together with providing the right to manage the domain, the one or more registered characteristics of the domain are provided to the second domain management device.

In an optional embodiment of step 212, the domain registration server provides the right to manage the domain to the second domain management device only if the domain registration server trusts the second domain management device. If the domain registration server does not trust the second domain management device, the domain registration server refuses the right to manage the domain.

In another embodiment of the method 200, the domain registration server creates domains. Additional method steps are performed before step 208. In step 202, the first domain management device requests creation of the domain at the domain registration server. In response to receiving the creation request, the domain registration server creates, in step 204, the domain and the right to manage the domain. In step 206, the right to manage the domain is provided to the first domain management device.

In another embodiment, the right to manage the domain provided to the second domain management device is a temporal right. In step 214, the second domain management device requests prolongation of the temporal right to manage the domain at the domain registration server. In step 216, the domain registration server provides prolongation of the temporal right to manage the domain.

In an optional embodiment of step 216, it is further determined whether the domain registration server still trusts the second domain management device. If there is not enough trust, the domain registration server refuses prolongation of the temporal right to manage the domain. If there is a reasonable amount of trust, the domain registration server provides prolongation of the temporal right to manage the domain to the second domain management device. If the domain registration server fully trusts the second domain management device, an indefinite right to manage the domain is provided to the second domain management device.

In another embodiment, the domain registration server stores all activities performed by the domain registration server in relation to the domain in a domain history data file. The domain history data file is analyzed in order to determine the amount of trust the domain registration server has with regard to the second domain management device. The method 200 of restoring domain management further comprises step 218 of detecting fraud with regard to the domain by analyzing the domain history data file.

The analysis of the domain history data file may include matching timestamps of receiving data from domain management devices with the timestamps representing the moment since when domain management devices are supposed to have been out of order. It may result in the detection of fraud committed by the first domain management device if this device contacts the domain registration server, while the first domain management device is supposed to have been out of order for a long time. It may also result in the detection of possible fraud committed by the second domain management device if many requests for obtaining the right to manage the domain are received in a short period after providing the right to manage the domain to the second domain management device. Receiving many requests for obtaining the right to manage the domain in a short period indicates that probably all submitters of the requests may not be trusted. It should be noted that detecting fraud may be based on a rule-based system that detects specific situations in which one of the domain management devices is probably fraudulent.

If fraud by the first domain management device and/or by the second domain management device is detected, the domain registration server sends, in step 220, a domain inactivation agent to the respective first domain management device and/or the second domain management device. The first domain management device and/or the second domain management device have a processor and the domain inactivation agent is a piece of program code that is executed on the processor of the respective first domain management device and/or second domain management device. The result of the execution of the piece of program code is the inactivation of the domain management by the respective first domain management device and/or the second domain management device. The piece of program code may comprise instructions to delete the right to manage the domain at the domain management device. The piece of program code may also comprise instructions to change the values of variables, for example, the variable of a temporal right to manage the domain that indicates until which moment the domain management device may manage the domain. By setting the date until which the domain management device may manage the domain at a moment in the past, the temporal right to manage the domain has expired. It should be noted that the examples of the instructions of the pieces of program code are not limited to the examples given in the embodiment. Each specific digital rights management technology requires its own specific technique to inactivate the management of the domain.

Figure 3:
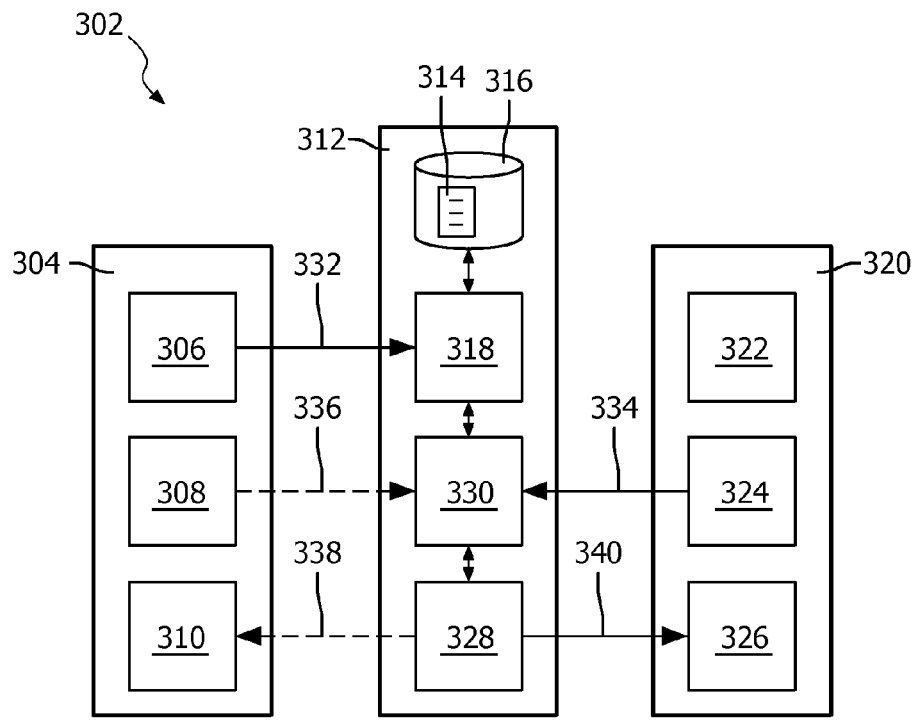

A third embodiment is shown in FIG. 3. FIG. 3 schematically shows a first system 302 for restoring domain management. The first system 302 comprises a first domain management device 304, a domain registration server 312 and a second domain management device 320. The first domain management device and the second domain management device comprise a registration means 306, 322 for registering, at the domain registration server 312, one or more characteristics of the domain that is managed by the respective domain management device, a request transmitter 308, 324 for sending a request to the domain registration server 312 for obtaining the right to manage the domain, and both domain management devices comprise a right-to-manage receiver 310, 326 for receiving the right to manage the domain, together with receiving the one or more characteristics of the domain. The domain registration server 312 comprises a data storage 316 for storing a domain history data file 314 and the one or more characteristics of the domain, a one-or-more-characteristics receiver 318 for receiving the registration of one or more characteristics from one or more domain management devices, and a request receiver 330 for receiving the request for obtaining the right to manage the domain from one or more domain management devices. The domain registration server also comprises a right-to-manage transmitter 328 for providing or refusing the right to manage the domain together with providing the one or more registered characteristics of the domain to one or more of the domain management devices.

In a typical case of use, the first domain management device 304 is managing the domain. The domain comprises a plurality of devices (not shown) that share a set of content. The first domain management device 304 has bound the plurality of devices to the domain and stores at least a subset of the licenses and decryption keys that are bound to the domain. At a specific moment, the first domain management device 304 sends a registration message 332 from its registration means 306 to the one-or-more-characteristics receiver 318 of the domain registration server 312. The registration message is intended for registering one or more characteristics of the domain managed by the first domain management device 304. The domain registration server 312 stores the received one or more characteristics in the data storage 316 and updates the domain history data file 314 with information related to the reception of the one or more characteristics, for example, a timestamp is registered and a pointer to the one or more characteristics in the data storage 316 is registered in the domain history data file 314. The one or more characteristics contained in the registration message are, for example, a list of devices which are bound to the domain and copies of the licenses and decryption keys stored on the first domain management device 304.

At a later moment in time, the second domain management device 320 contacts the domain registration server 312 after breakdown of the first domain management device 304. The request transmitter 324 of the second domain management device 320 sends a request message 334 to the request receiver 330 of the domain registration server 312. Subsequently, the domain registration server 312 decides whether the second domain management device is trusted. This may be done by analyzing the domain history data file 314. The conclusion may be that the second domain management device is trusted because the first domain management device seems to have been in operation for a long time and is likely to have broken down. If the domain registration server 312 trusts the second domain management device 320, the right-to-manage transmitter 328 sends a provision message 340 to the right-to-manage receiver 326 of the second domain management device 320. This provision message provides the right to manage the domain to the second domain management device 320 and provides the registered one or more characteristics of the domain that were stored in the data storage 316. Subsequently, the domain registration server 312 updates the domain history data file with information related to receiving the request message and sending the provision message.

A little later in time, the request transmitter of the first domain management device 304 sends a request message 336 to the request receiver 318 of the domain registration server 312 for obtaining the right to manage the same domain as that for which the right to manage the domain had recently been provided to the second domain management device 320. For example, the user may have repaired the first domain management device 304 and, after the repair, the domain management software contacts the domain registration server 312. By analyzing the domain history data The 314, the domain registration server 312 discovers that the first domain management device 304 is supposed to be out of order and may not be the domain management device for managing the domain. Subsequently, the right-to-manage transmitter 328 sends a message 338 containing the refusal of the right to manage the domain to the right-to-manage receiver 310 of the first domain management device 304.

Figure 4:
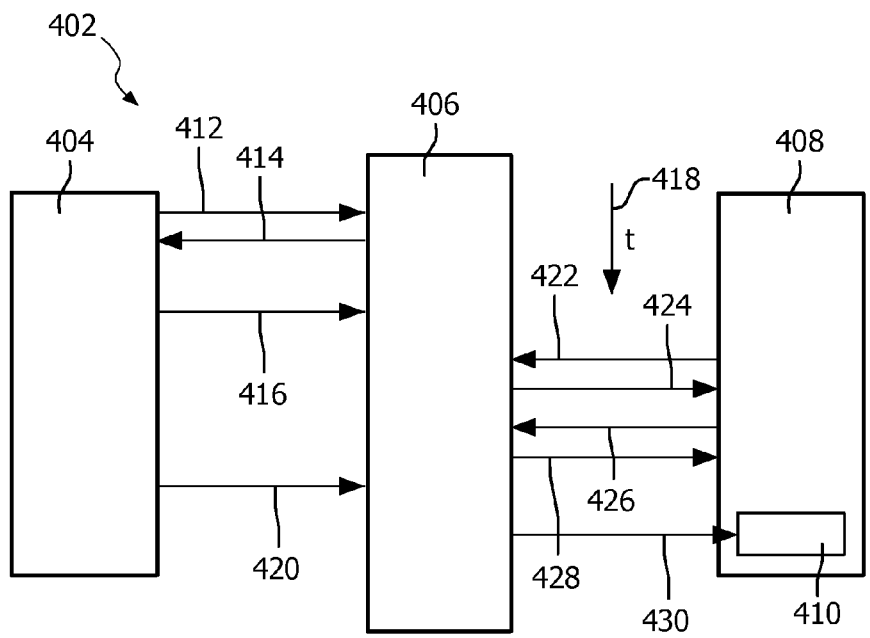

A fourth embodiment is shown in FIG. 4. FIG. 4 schematically shows a second system 402 for restoring domain management. The second system 402 comprises a first domain management device 404, a domain registration server 406 and a second domain management device 408. A plurality of transmissions of a message 412, 414, 416, 420, 422, 424, 426 is shown by means of respective arrows. The message originates from the device where the arrow starts and is transmitted to the device to which the arrow points. The arrow 418 with the letter t indicates a timeline. If the transmission of a message 412, 414, 416, 420, 422, 424, 426 is drawn at a lower position on the timeline, it is transmitted at a later moment in time.

In this embodiment, the domain registration server 406 is also intended for creating new domains. To create a new domain, the first domain management device 404 transmits a creation request message 412 to the domain registration server 406 comprising the request to create the new domain. If the domain registration server 406 is willing to create the new domain and to provide the right to manage the new domain to the first domain management device 404, the domain registration server 406 transmits a provision message 414 to the first domain management device 404. The provision message 414 comprises the right to manage the domain. The domain registration server 406 creates a domain history data file with information related to the creation of the domain and the provision of the right to manage the domain to the first domain management device 404.

Later in time, when the first domain management device 404 has bound, for example, a new device to the domain and/or has received, for example, licenses and decryption keys of content, the first domain management device 404 transmits a first registration message 416 to the domain registration server 406. The first registration message 416 comprises, for example, the information that the new device has entered the domain and/or comprises, for example, copies of the licenses and decryption keys. The domain registration server 406 stores the received information in a secure storage and updates the domain history data file with information related to the registration of the domain information.

After some time, the second domain management device transmits a request message 422 to the domain registration server 406. The request message 422 comprises a request for obtaining the right to manage the domain. The domain registration server 406 determines whether it trusts the second domain management device and, in the case drawn in FIG. 4, the second domain management device is trusted to a certain degree and the domain registration server 406 is willing to give the second domain management device 408 a temporal right to manage the domain. The domain registration server 406 transmits a provision message 424 to the second domain management device 408. The provision message 424 comprises the temporal right to manage the domain and the one or more characteristics of the domain which are required at the second domain management device 408 to restore the domain management. In addition, the domain registration server 406 updates the domain history data file with information related to receiving the request and transmitting the provision of the right to manage the domain.

As the right to manage the domain, received by the second domain management device 408, is only temporal, this device has to renew the provision of the right to manage the domain. Later in time, at least before termination of the temporal right to manage the domain, the second domain management device 408 therefore transmits a prolongation request message 426 to the domain registration server 406. In the example shown in FIG. 4, the domain registration server 406 still trusts the second domain management device to a certain degree and is willing to prolong the temporal right to manage the domain. The domain registration server 406 will reply to receiving the prolongation request message 426 with a prolongation provision message 428 that comprises the prolongation of the temporal right to manage the domain.

However, the first domain management device 404 was not out of order and is still managing the domain. The first domain management device 404 has bound, for example, a new device to the domain and transmits a second registration message 420 to the domain registration server 406. The second registration message 420 comprises information about binding of the new device to the domain. By receiving another registration message from the first domain management device 404, the domain registration server 406 detects that at least one of the domain management devices is fraudulent. It is impossible that two different domain management devices are managing the domain. In the example shown in FIG. 4, the domain registration server 406 decides that the first domain management device 404 is trusted because it was the initial device that requested creation of the domain and because the request to manage the domain of the second domain management device 408 is probably a fraudulent attack to the domain.

The result of detecting fraud by the second domain management device may result either in not providing prolongation of the temporal right to manage the domain or in transmitting a domain inactivation message 430 to the second domain management device 408. The domain inactivation message 430 is received by a processor 410 of the second domain management device 408. The domain inactivation message comprises a domain inactivation agent. The domain inactivation agent is a piece of program code that is automatically executed by the processor 410 of the second domain management device 408. Running the domain inactivation agent has the result that the domain management is discontinued by the second domain management device 408.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of restoring domain management for a domain in which content access rights are shared between one or more devices, wherein the domain management was executed by a first domain management device, the method comprising the acts of:
   registering one or more characteristics of the domain at a domain registration server by the first domain management device before the first domain management device discontinues the domain management of the domain, wherein the domain registration server is configured to create new domains and to provide rights to manage the domains, and wherein the first domain management device is configured to bind devices to the domain;
   sending a request for obtaining a right to manage the domain from a second domain management device to the domain registration server; and
   providing by the domain registration server the right to manage the domain together with at least one of the registered one or more characteristics of the domain to the second domain management device,
   wherein the providing act provides a first type of the right to manage when a trust of the second domain management device by the domain registration server is at a first trust level, and provides a second type of the right to manage when the trust of the second domain management device by the domain registration server is at a second trust level, knowledge of inactivation of the domain management at the first domain management device results in the second trust level in the second domain management, the second trust level being greater than the first trust level.

2. The method of restoring domain management according to claim 1, wherein the first type of the right to manage is a temporal right to manage the domain and is only provided if the domain registration server has the first trust level to reasonably to trust the second domain management device, and wherein the second type of the right to manage is an indefinite right to manage the domain and is only provided if the domain registration server has the second trust level in the second domain management device.

3. The method of restoring domain management according to claim 2, the method further comprising the acts of:
   requesting prolongation of the temporal right to manage the domain by the second domain management device; and
   providing prolongation of the temporal right to manage the domain by the domain registration server to the second domain management device.

4. The method of restoring domain management according to claim 3, wherein prolongation of the temporal right to manage the domain is only provided if the domain registration server has the first trust level to reasonably trust the second domain management device, wherein the domain registration server refuses prolongation of the temporal right to manage the domain if the domain registration server does not trust the second domain management device, and wherein the domain registration server provides prolongation of the temporal right to manage the domain by providing an indefinite right to manage the domain to the second domain management device if the domain registration server has the second trust in the second domain management device.

5. The method of restoring domain management according to claim 1, wherein the one or more characteristics of the domain comprise at least one of the following: name of the domain, policies of the domain, a list of bindings to the domain, one or more copies of bindings between the devices of the domain and the domain, one or more copies of bindings between content and the domain, one or more copies of licenses belonging to the content, one or more copies of security keys belonging to the content, or password of the domain.

6. The method of restoring domain management according to claim 1, the method further comprising the acts of:
requesting creation of the domain by the first domain management device at the domain registration server,
creating the right to manage the domain in the domain registration server; and
providing the right to manage the domain to the first domain management device.

7. The method of restoring domain management according to claim 1, the method further comprising the act of:
requesting the domain registration server to undo the registration of at least one of the registered one or more characteristics of the domain by the first domain management device or the second domain management device.

8. The method of restoring domain management according to claim 1, wherein the domain is a Marlin domain and the first domain management device and the second domain management device are Marlin devices.

9. A system for restoring domain management for a domain in which content access rights are shared between one or more devices, wherein the domain management was executed by a first domain management device, the system comprising:
a domain registration server configured to register one or more characteristics of the domain, the one or more characteristics being received from the first domain management device before the first domain management device discontinues management of the domain, wherein the domain registration server is further configured to create new domains and to provide rights to manage the domains, and wherein the first domain management device is configured to bind devices to the domain; and
a second domain management device configured to send a request for obtaining a right to manage the domain and to receive the right to manage the domain together with the one or more characteristics of the domain,
wherein, in response to receiving the request for obtaining the right to manage the domain, the domain registration server is further configured to provide, to the second domain management device, the right to manage the domain together with at least one of the registered one or more characteristics of the domain; and
wherein the domain registration server is further configured to provide a first type of the right to manage when a trust of the second domain management device by the domain registration server is at a first trust level, and provide a second type of the right to manage when the trust of the second domain management device by the domain registration server is at a second trust level, knowledge of inactivation of the domain management at the first domain management device results in the second trust level in the second domain management, the second trust level being greater than the first trust level.

10. The system of claim 9, wherein the first type of the right to manage is a temporal right to manage the domain and is only provided if the domain registration server has the first trust level to reasonably to trust the second domain management device, and wherein the second type of the right to manage is an indefinite right to manage the domain and is only provided if the domain registration server has the second trust level in the second domain management device.

11. The system of claim 9, wherein the domain registration server stores a set of activities in a domain history data file, wherein the activities were executed on the domain registration server with regard to the domain, and wherein the domain history data file is analyzed by the domain registration server to determine an amount of trust the domain registration server has in the second domain management device.

12. A system for restoring domain management for a domain in which content access rights are shared between one or more devices, wherein the domain management was executed by a first domain management device, the system comprising:
means for registering one or more characteristics of the domain at a domain registration server by the first domain management device before the first domain management device discontinues the domain management of the domain, wherein the domain registration server is configured to create new domains and provide rights to manage the domains, and wherein the first domain management device is configured to bind devices to the domain;
means for sending a request for obtaining a right to manage the domain from a second domain management device to the domain registration server; and
means for providing by the domain registration server the right to manage the domain together with at least one of the registered one or more characteristics of the domain to the second domain management device,
wherein the means for providing provides a first type of the right to manage when a trust of the second domain management device by the domain registration server is at a first trust level, and provides a second type of the right to manage when the trust of the second domain management device by the domain registration server is at a second trust level, knowledge of inactivation of the domain management at the first domain management device results in the second trust level in the second domain management, the second trust level being greater than the first trust level.

13. The system of claim 12, wherein the first type of the right to manage is a temporal right to manage the domain and is only provided if the domain registration server has the first trust level to reasonably to trust the second domain management device, and wherein the second type of the right to manage is an indefinite right to manage the domain and is only provided if the domain registration server has the second trust level in the second domain management device.

14. The system of claim 12, wherein the domain registration server stores a set of activities in a domain history data file, wherein the activities were executed on the domain registration server with regard to the domain, and wherein the domain history data file is analyzed by the domain registration server to determine an amount of trust the domain registration server has in the second domain management device.

15. The method of claim 2, wherein the indefinite right to manage cannot be cancelled.

16. A method of restoring domain management for a domain in which content access rights are shared between one or more devices, wherein the domain management was executed by a first domain management device, the method comprising the acts of:

registering one or more characteristics of the domain at a domain registration server by the first domain management device before the first domain management device discontinues the domain management of the domain, wherein the domain registration server is configured to create new domains and to provide rights to manage the domains, and wherein the first domain management device is configured to bind devices to the domain;

sending a request for obtaining a right to manage the domain from a second domain management device to the domain registration server;

providing by the domain registration server the right to manage the domain together with at least one of the registered one or more characteristics of the domain to the second domain management device;

building by the domain registration server a list of domain management devices which are supposed to be out of order, including times when the domain management devices of the list were out of order; and including in the list timestamps of moments at which the domain management devices of the list contacted the domain registration server, wherein the domain registration server stores a set of activities in a domain history data file, wherein the activities were executed on the domain registration server with regard to the domain, wherein the domain history data file is analyzed by the domain registration server to determine an amount of trust the domain registration server has in the second domain management device, and wherein the domain history data file includes information related to registering the one or more characteristics, receiving requests to obtain the right to manage the domain, results of previous analyses, providing and/or refusing the right to manage the domain, a moment when an activity took place, the domain management device with which a communication took place, pointers to locations where the one or more characteristics were stored, and wherein an analysis of the data history file includes statistical analysis of a number of received requests to obtain the right to manage the domain and frequency with which requests to obtain the right to manage arrived.

17. The method of restoring domain management according to claim 16, the method further comprising the act of:

detecting fraud with regard to the domain by analyzing the domain history data file in the domain registration server; and inactivating the domain management at the first domain management device and/or the second domain management device by the domain registration server.

18. The system of claim 10, wherein the indefinite right to manage cannot be cancelled.

19. The system of claim 13, wherein the indefinite right to manage cannot be cancelled.

* * * * *